(12) United States Patent
Chenevier et al.

(10) Patent No.: US 10,968,107 B2
(45) Date of Patent: Apr. 6, 2021

(54) METHOD FOR PREPARING SILICON AND/OR GERMANIUM NANOWIRES

(71) Applicant: COMMISSARIAT A L'ENERGIE ATOMIQUE, Paris (FR)

(72) Inventors: Pascale Chenevier, La Tronche (FR); Peter Reiss, Saint Egreve (FR)

(73) Assignee: COMMISSARIAT A L'ENERGIE ATOMIQUE, Paris (FR)

( * ) Notice: Subject to any disclaimer, the term of this patent is extended or adjusted under 35 U.S.C. 154(b) by 137 days.

(21) Appl. No.: 16/079,936

(22) PCT Filed: Feb. 28, 2017

(86) PCT No.: PCT/FR2017/050450
§ 371 (c)(1),
(2) Date: Aug. 24, 2018

(87) PCT Pub. No.: WO2017/149240
PCT Pub. Date: Sep. 8, 2017

(65) Prior Publication Data
US 2019/0047870 A1 Feb. 14, 2019

(30) Foreign Application Priority Data
Feb. 29, 2016 (FR) ...................................... 1651679

(51) Int. Cl.
*C01B 33/021* (2006.01)
*B01J 27/043* (2006.01)
(Continued)

(52) U.S. Cl.
CPC ............ *C01B 33/021* (2013.01); *B01J 21/06* (2013.01); *B01J 27/04* (2013.01); *B01J 27/043* (2013.01);
(Continued)

(58) Field of Classification Search
CPC ......... C01B 33/021; B01J 35/06; B01J 27/04; B01J 37/031; B01J 35/002; B01J 35/0013;
(Continued)

(56) References Cited

U.S. PATENT DOCUMENTS

2008/0135089 A1* 6/2008 Tsakalakos ......... H01L 31/0352
136/248

FOREIGN PATENT DOCUMENTS

JP 2007055836 A * 3/2007
WO 2015/189827 A1 12/2015

OTHER PUBLICATIONS

Tuan, Hsing-Yu, Doh C. Lee, and Brian A. Korgel. "Nanocrystal-mediated crystallization of silicon and germanium nanowires in organic solvents: the role of catalysis and solid-phase seeding." Angewandte Chemie International Edition 45.31 (2006): 5184-5187.*

(Continued)

*Primary Examiner* — Richard M Rump
(74) *Attorney, Agent, or Firm* — Christensen O'Conner Johnson Kindness PLLC (57) ABSTRACT

The invention relates to a method for preparing a material made of silicon and/or germanium nanowires, comprising the steps of:
i) placing a source of silicon and/or a source of germanium in contact with a catalyst comprising a binary metal sulfide or a multinary metal sulfide, said metal(s) being selected from among Sn, In, Bi, Sb, Ga, Ti, Cu, and Zn, by means of which silicon and/or germanium nanowires are obtained,
ii) optionally recovering the silicon and/or germanium nanowires obtained in step (i);
the catalyst and, optionally, the source of silicon and/or the source of germanium being heated before, during (Continued)

and/or after being placed in contact under temperature and pressure conditions that allow the growth of the silicon and/or germanium nanowires.

10 Claims, 3 Drawing Sheets

(51) Int. Cl.
| | |
|---|---|
| *B01J 35/02* | (2006.01) |
| *C22B 41/00* | (2006.01) |
| *H01M 4/134* | (2010.01) |
| *H01M 4/38* | (2006.01) |
| *H01G 11/50* | (2013.01) |
| *B01J 21/06* | (2006.01) |
| *B01J 35/00* | (2006.01) |
| *B01J 37/03* | (2006.01) |
| *B01J 27/04* | (2006.01) |
| *B01J 35/06* | (2006.01) |
| *C01G 17/00* | (2006.01) |
| *H01M 4/02* | (2006.01) |

(52) U.S. Cl.
CPC ......... *B01J 35/002* (2013.01); *B01J 35/0013* (2013.01); *B01J 35/023* (2013.01); *B01J 35/06* (2013.01); *B01J 37/031* (2013.01); *C01G 17/00* (2013.01); *C01G 17/006* (2013.01); *C22B 41/00* (2013.01); *H01G 11/50* (2013.01); *H01M 4/134* (2013.01); *H01M 4/38* (2013.01); *H01M 4/386* (2013.01); *B01J 2523/27* (2013.01); *B01J 2523/32* (2013.01); *B01J 2523/33* (2013.01); *B01J 2523/43* (2013.01); *B01J 2523/44* (2013.01); *B01J 2523/47* (2013.01); *B01J 2523/54* (2013.01); *C01P 2002/88* (2013.01); *C01P 2004/03* (2013.01); *C01P 2004/16* (2013.01); *H01M 2004/022* (2013.01); *Y02E 60/13* (2013.01)

(58) Field of Classification Search
CPC ........ B01J 21/06; B01J 35/023; B01J 27/043; B01J 2523/54; B01J 2523/47; B01J 2523/44; B01J 2523/43; B01J 2523/33; B01J 2523/32; B01J 2523/27; H01M 4/38; H01M 4/386; H01M 4/134; H01M 2004/022; H01G 11/50; C22B 41/00; Y02E 60/13; C01P 2004/03; C01P 2002/88; C01P 2004/16; C01G 17/006; C01G 17/00
See application file for complete search history.

(56) References Cited

OTHER PUBLICATIONS

Chockla, Aaron M., et al. "Solution-grown germanium nanowire anodes for lithium-ion batteries." ACS applied materials & interfaces 4.9 (2012): 4658-4664.*

Karki, Khim, et al. "Lithium-assisted electrochemical welding in silicon nanowire battery electrodes." Nano letters 12.3 (2012): 1392-1397.*

Peled, Emanuel, et al. "Tissue-like silicon nanowires-based three-dimensional anodes for high-capacity lithium ion batteries." Nano letters 15.6 (2015): 3907-3916.*

Hanrath, T., and B.A. Korgel, "Supercritical Fluid-Liquid-Solid (SFLS) Synthesis of Si and Ge Nanowires Seeded by Colloidal Metal Nanocrystals," Advanced Materials 15(5):437-440, Mar. 2003.

International Search Report dated May 16, 2017, issued in corresponding International Application No. PCT/FR2017/050450, filed Feb. 28, 2017, 6 pages.

Liu, J., et al., "Tin Catalyzed Silicon Nanowires Prepared by Magnetron Sputtering," Materials Letters 151:122-125, Jul. 2015.

Niu, J.-J., and J.-N. Wang, "A Study in the Growth Mechanism of Silicon Nanowires With or Without Metal Catalyst," Materials Letters 62(4-5):767-771, Feb. 2008.

Tuan, H.-Y., et al., "Silicon Nanowires and Silican Nanotubes Seeded by Copper Nanoparticles in an Organic Solvent," Chemistry of Materials 20(6):2306-2313, Mar. 2008.

* cited by examiner

METHOD FOR PREPARING SILICON AND/OR GERMANIUM NANOWIRES

The present invention relates to a method for preparing a material made of silicon and/or germanium nanowires, the materials obtainable according to this method and the use thereof particularly in lithium batteries, in supercondensers, in thermoelectric devices for recovering energy or cooling, and in electronic detectors of chemical or biological substances in gas or liquid phase.

Nanowires are particularly useful for numerous applications, thanks to the large developed surface area thereof compared with the low volume thereof, added to the capacity thereof to form interlaced and flexible lattices. In particular, nanowires of elements of group IV, such as Si, Ge, the alloys thereof and the derivatives thereof, have shown specific qualities as a material in electronics and devices for energy. For example, silicon nanowires, as a single object or as a lattice, provide the sensitive part of electronic chemical detectors with a very high level of sensitivity; silicon or germanium nanowires introduced into the active anode material of lithium-ion batteries, greatly increase the energy-storage capacity of the battery.

However, despite the numerous fields of application thereof, Si and/or Ge nanowires remain difficult to produce on an industrial scale. Methods of choice regarding structural quality are still the methods of growth from gas precursors, of the chemical vapour deposition (CVD) type, or by pyrolysis. These methods are difficult and expensive, and they demand close control of the method. One of the limiting aspects is the preparation of catalysts, necessary for growth. One growth mechanism is, for example, vapour-liquid-solid (VLS) growth: catalysts in the form of small droplets or small crystals of a material capable of dissolving atoms constituting the nanowire are placed in the presence of vapours containing these atoms. When the catalyst comes to saturation, the dissolved atoms coalesce on the surface of the catalyst and precipitate or crystallise in the form of a nanowire. It has been broadly demonstrated that controlling the size of the catalyst droplet determines the homogeneity in diameter of the nanowires obtained. It has also been demonstrated in the literature that the diameter of the nanowires is determinant for the doping rate thereof. The diameter of the nanowires is a very significant parameter in most of the applications thereof; in Li-ion batteries, it strongly impacts the stability and decrease in capacity during cycling.

It is easily understood that, to ensure control of the qualities of the nanowires, such as diameter, doping and crystallinity, it is of prime importance to control the size and the type of the catalysts.

The most commonly used catalysts are metals, in the form of droplets or solid masses of nanometric size. The catalyst can be introduced already in the form of metal nanoparticles. Alternatively, the metal which will form the catalyst can be introduced in the form of a thin metal layer which is liquefied under the effect of the heat at the start of the growth method, then dewets from the substrate into small metal droplets. The metal can also be introduced in the form of a metal salt layer, adsorbed on the growth substrate, and reduced under the effect of a reducing gas such as hydrogen at the start of the growth method. In pyrolytic methods, the metal can be introduced in the form of an organometallic compound which is decomposed during the growth and deposits the metal in the form of nanoparticles or droplets on the growth substrate.

These methods are well suited to certain metals such as gold and iron. However, the presence of gold, iron or other metals is undesirable in a number of applications. For example, gold and iron are not compatible with CMOS (Complementary Metal Oxide Semiconductor) methods, as they pollute the silicon; numerous electrochemically active metals are to be forbidden in batteries, as they damage the components and performance thereof[1]; certain metal nanoparticles present on nanowires cause an extinction of the nanowires' luminescence[2].

To obtain Si or Ge nanowires with no undesired metal particle, silicon nanowires without gold have been synthesised from silicon nanowires containing gold nanoparticles, but this requires stripping the silicon layer covering the gold, and then etching the gold according to the well-known methods defined by Lim et al.[3] or by Chockla et al.[4]. They can be obtained by growth over a large variety of solid metal substrates according to Yuan et al.[5] (Ag, Al, Cu, Fe, Ni, Pb, Ti) and thin metal films according to Richards et al.[6] (Ag, Al, Cr, Cu, Ni).

Silicon nanowires can also be obtained by growth without catalyst according to Lim et al.[7], however through high-temperature methods (735-955° C.). A growth of silicon and germanium nanowires without a catalyst is possible between 490° C. and 660° C. according to Kim et al.[8], but it requires a highly controlled Si:H hydrogenated silicon substrate, oxidised with ultrapure water just before growth.

Bogart et al. have demonstrated the growth of silicon nanowires on tin nanoparticles at 450° C. with the disappearance of the tin nanoparticle during synthesis, the tin being incorporated in the silicon of the nanowires during the growth method[9]. In this work, the growth is done by supercritical phase method, and the tin is introduced in the form of an organometallic compound $Sn(HMDS)_2$.

To industrially obtain Si and/or Ge nanowires, it is also particularly useful to decrease the temperature of the growth method, in order to decrease the cost and the ecological footprint of the method. A low growth temperature can also be achieved in reactors and on substrates that are less resistant to heat, and the selection of materials is therefore wider.

A catalyst metal with a low melting point makes it possible to lower the growth temperature of the nanowires as melted metal droplets are obtained at a lower temperature.

To reduce the growth temperature of the silicon nanowires: metals with a low melting point have been used, such as tin, bismuth and indium.

Indium is an effective catalyst for the growth of silicon nanowires[10] at 450° C., but this is a rare and expensive metal.

Bismuth is an effective catalyst for the growth of silicon nanowires[11] from 280° C., and metal tin[12] from 250° C., in the case of a growth from a silicon block evaporated through magnetron sputtering. This method is expensive and difficult to use on an industrial scale.

Tin is a useful metal as a silicon nanowire growth catalyst, as it has a low melting point, it forms a eutectic at 232° C. with silicon, and it causes hardly any undesirable effects in silicon nanowire applications. In particular, tin is compatible with the chemistry of lithium-ion batteries. It is also an abundant metal, inexpensive and not very toxic.

Tin as a catalyst makes it possible to obtain silicon nanowires from 200° C. as demonstrated by Lu et al.[13] from cyclohexasilane and tin nanoparticles.

VLS type growth methods have shown the possibility of obtaining silicon nanowires for a temperature of at least 410° C. on tin nanoparticles[14], and of at least 400° C. on copper oxide according to patent FR 2 944 783. The synthesis of silicon nanowires on gold is generally done at a temperature greater than 450° C., but under certain conditions silicon nanowires can be obtained at a temperature of at least 420° C. in flow[15], of at least 375° C. on gold nanoparticles according to application WO2010/120849, and of at least 360° C. on gold nanoparticles[16].

Tin is one of the only catalysts making it possible to obtain silicon nanowires without metals to be removed, at a low temperature.

However, tin nanoparticles are oxidised spontaneously and quickly with air, they must then be reduced to go back to the metal form thereof, which makes the use thereof difficult through the above-mentioned techniques. Tin nanoparticles and thin layers are oxidised very quickly if they are not kept in an inert atmosphere. Moreover, tin organometallic compounds that can be used as a pyrolytic tin source are toxic.

A method for synthesising silicon and/or germanium nanowires has now been developed, using as a growth catalyst of said nanowires, a metal sulfide, in particular tin sulfide. For example, tin sulfide nanoparticles are more stable in air than tin nanoparticles, and form a thinner surface oxide layer.[17]

Unexpectedly, it has been shown that all or part of the metal sulfide, in particular tin sulfide, is converted into metal, in particular into tin, during the heating of the initial reaction environment further comprising the metal sulfide, a silicon source and/or a germanium source.

Thus, further to the advantages linked to the greater stability in air thereof, the metal sulfides provide advantages for the metal itself, as a catalyst, namely one or more of the following advantages:
- the decrease in the temperature necessary for the growth of the nanowires,
- the fact that it is not necessary to remove said metal from the nanowires after growth to obtain luminescent nanowires,
- the fact that it is not necessary to remove said metal from the nanowires after growth to use the nanowires in a material for a lithium-ion battery,
- the fact that said metal is inexpensive and non-toxic,
- the fact that said metal is miscible with silicon and with germanium and can be dissolved in the nanowire.

Thus, a first subject-matter of the invention relates to a method for preparing a material made of silicon and/or germanium nanowires, comprising the steps of:
(i) placing a silicon source and/or a germanium source in contact with a catalyst comprising a binary metal sulfide or a multinary metal sulfide, said metal(s) being selected from Sn, In, Bi, Sb, Ga, Ti, Cu, and Zn, by means of which the silicon and/or germanium nanowires are obtained,
(ii) optionally recovering the silicon and/or germanium nanowires obtained in step (i);
the catalyst, and optionally the silicon source and/or the germanium source, being heated before, during and/or after being placed in contact under temperature and pressure conditions that allow the growth of silicon and/or germanium nanowires.

A binary metal sulfide comprises, in addition to sulphur, a metal.

A multinary metal sulfide, in particular ternary or quaternary, comprises, in addition to sulphur, at least two metals, and in particular two metals in the case of a ternary metal sulfide, and three metals in the case of a quaternary metal sulfide.

According to an embodiment, the catalyst and the silicon source and/or the germanium source are heated after being placed in contact.

According to another embodiment, the catalyst, and optionally the silicon source and/or the germanium source, is heated before being placed in contact, the heating being optionally extended during and after said being placed in contact.

According to an embodiment, the invention relates to a method for preparing a material made of silicon and/or germanium nanowires, wherein step (i) comprises the steps of:
1. placing a silicon source and/or a germanium source in contact with a catalyst comprising a binary metal sulfide or a multinary metal sulfide, said metal(s) being selected from Sn, In, Bi, Sb, Ga, Ti, Cu, and Zn, to obtain an initial reaction medium;
2. heating the initial reaction medium under temperature and pressure conditions that allow the growth of silicon and/or germanium nanowires, by means of which the silicon and/or germanium nanowires are obtained.

According to an embodiment, the invention relates to a method for preparing a material made of silicon and/or germanium nanowires, wherein step (i) comprises the steps of:
1. heating a catalyst comprising a binary metal sulfide or a multinary metal sulfide, said metal(s) being selected from among Sn, In, Bi, Sb, Ga, Ti, Cu, and Zn, at a temperature T and under a pressure P, to obtain a catalyst at the temperature T and under the pressure P;
2. placing a silicon source and/or a germanium source in contact with the catalyst at the temperature T and under the pressure P obtained from step 1, by means of which the silicon and/or germanium nanowires are obtained;
the temperature T and the pressure P allowing the growth of the silicon and/or germanium nanowires.

Thus, said metal(s) is/are particularly selected from among Sn, In, Bi, Sb, and Ga. More generally, the metals can be selected from among metals the melting temperature of which at atmospheric pressure is less than 300° C., and in particular, from among Sn, In, Bi and Ga, or from among metals the melting temperature at atmospheric pressure of which is less than 650° C., in particular Sb.

According to an embodiment, the catalyst is in the form of nanoparticles. The nanoparticle form has the following advantages:
- the decrease in melting temperature of the metal in the form of nanoparticles, and consequently the decrease in the temperature necessary for the growth of the nanowires,
- in the case of nanoparticles that are homogenous in diameter, the possibility of obtaining nanowires that are homogenous in diameter,
- in the case of nanoparticles that are homogenous in diameter, the possibility of obtaining doped nanowires that are homogenous in doping rate.

According to another embodiment, the catalyst is in the form of nanoparticles, the diameter of which is between 5 and 30 nm.

According to an embodiment, the metal is tin. The metal sulfide is thus, in particular, a binary metal sulfide of formula $SnS$, $SnS_2$ or $Sn_2S_3$. Preferably, the catalyst is in the form of tin sulfide nanoparticles.

Further to the advantages linked to the increased stability of tin sulfide in air, the tin sulfide provides advantages for the tin itself, as a catalyst, namely:

the decrease in the temperature necessary for the growth of the nanowires, the fact that it is not necessary to remove tin from the nanowires after growth to obtain luminescent nanowires, the fact that it is not necessary to remove tin from the nanowires after growth to use the nanowires in a material for a lithium-ion battery, the fact that tin is inexpensive and non-toxic, the fact that tin is miscible with silicon and with germanium and can be dissolved in the nanowire, which makes it possible particularly to advantageously obtain photoluminescent nanowires.

According to an embodiment, the catalyst comprising a metal sulfide is a catalyst comprising tin sulfide in the form of nanoparticles.

The tin sulfide nanoparticles are advantageously stable in air, not forming any or forming little oxide.

These tin sulfide nanoparticles can further be prepared easily, from simple metal salts according to operating methods well known to a person skilled in the art[18,19], whereas the synthesis of tin nanoparticles requires the use of sensitive reducing agents. Controlling the diameter thereof is easy. This is because they can be obtained in the form of a suspension of calibrated nanoparticles. In particular, the synthesis of tin sulfide nanoparticles by colloidal growth, as described in particular by Reiss et al.[20], makes it possible to obtain calibrated nanoparticles of a size selected from among a diameter range that is relevant for the growth of nanowires (5 to 30 nm). The homogenous defined size of the tin sulfide nanoparticles favours the obtaining of nanowires with homogenous diameters. During the synthesis of doped nanowires, the nanowire doping rate highly depends on the diameter: controlling a narrow distribution of nanowire diameters is therefore necessary to obtain a homogenous nanowire doping rate.

In the case of the growth of silicon nanowires, the use of tin sulfide nanoparticles is particularly useful, as it makes it possible to reduce the growth temperature below temperatures that have been possible up to date. Silicon nanowires can, for example, be obtained by growth from 350° C. on catalysts consisting of tin sulfide nanoparticles, by pyrolytic growth according to the method defined in French patent application FR 1 553 108.

According to an embodiment, the metal is indium, bismuth, antimony or gallium. The metal sulfide is thus, in particular, a binary metal sulfide, respectively of formula $In_2S_3$, $Bi_2S_3$, $Sb_2S_3$, $Ga_2S_3$ and GaS.

Apart from the advantages linked to the stability of indium, bismuth, antimony and gallium sulfides in air, the latter provide the advantages of indium, bismuth, antimony and gallium themselves, as a catalyst, namely:

the decrease in the temperature necessary for the growth of the nanowires, the fact that it is not necessary to remove indium, bismuth, antimony or gallium from the nanowires after growth to use the nanowires in a material for a lithium-ion battery.

According to an embodiment, the catalyst comprising a metal sulfide is indium, bismuth, antimony or gallium sulfide in the form of nanoparticles.

Indium, bismuth, antimony or gallium nanoparticles are advantageously stable in air, not forming any or forming little oxide.

These indium, bismuth, antimony or gallium nanoparticles can further be prepared easily, from simple metal salts[21,22,23]. Controlling the diameter thereof is easy.

According to an embodiment, the metal is titanium or copper. The metal sulfide is then a binary metal sulfide, respectively of formula $TiS_2$ and CuS or $Cu_{2-x}S$, x being between 0 and 0.2.

Apart from the advantages linked to the stability of titanium and copper sulfides in air, the latter provide the advantages of titanium and copper themselves, as a catalyst, namely:

the fact that it is not necessary to remove titanium or copper from the nanowires after growth to obtain the luminescent nanowires, the fact that it is not necessary to remove titanium or copper from the nanowires after growth to use the nanowires in a material for a lithium-ion battery, the fact that titanium and copper are inexpensive and non-toxic, the fact that titanium and copper are miscible with silicon and germanium can be dissolved in the nanowire, which makes it possible, in particular, to advantageously obtain photoluminescent nanowires.

According to an embodiment, the catalyst comprising a metal sulfide is titanium or copper sulfide in the form of nanoparticles. The nanoparticle form has the following advantages:

the decrease in melting temperature of the metal in the form of nanoparticles, and consequently the decrease in the temperature necessary for the growth of the nanowires, in the case of nanoparticles that are homogenous in diameter, the possibility of obtaining nanowires that are homogenous in diameter, in the case of nanoparticles that are homogenous in diameter, the possibility of obtaining doped nanowires that are homogenous in doping rate.

Titanium or copper sulfide nanoparticles are advantageously stable in air, not forming any or forming little oxide. Controlling the diameter thereof is easy. Titanium[24] or copper[25,26] sulfide nanoparticles can be obtained by the operating methods in the literature.

According to an embodiment, the metal is zinc. The metal sulfide is thus a binary metal sulfide of formula ZnS.

Apart from the advantages linked to the increased stability of zinc sulfide in air, the zinc sulfide provides advantages for the zinc itself, as a catalyst, namely the fact that zinc is inexpensive and non-toxic.

According to an embodiment, the catalyst comprising a metal sulfide is a catalyst comprising zinc sulfide in the form of nanoparticles. The nanoparticle form has the following advantages:

the decrease in melting temperature of the metal in the form of nanoparticles, and consequently the decrease in the temperature necessary for the growth of the nanowires, in the case of nanoparticles that are homogenous in diameter, the possibility of obtaining nanowires that are homogenous in diameter, in the case of nanoparticles that are homogenous in diameter, the possibility of obtaining doped nanowires that are homogenous in doping rate.

Zinc sulfide nanoparticles are advantageously stable in air, not forming any or forming little oxide.

These zinc sulfide nanoparticles can further be prepared easily, from simple metal salts[27,28,29]. Controlling the diameter thereof is easy.

According to an embodiment, the sulfide is a multinary metal sulfide selected from ternary or quaternary sulfides.

According to a specific embodiment, the sulfide is a multinary metal sulfide comprising Cu and In; Cu and Sn; Zn and Sn; or Cu and Bi.

According to a more specific embodiment, the sulfide is a ternary or quaternary metal sulfide selected from among $CuInS_2$, $Cu_2ZnSnS_4$ (referred to as CZTS), $CuBiS_2$, $Cu_3BiS_3$ and $Cu_2SnS_3$.

These sulfides give access, after removal of the sulphur during growth, to the catalyst nanoparticles consisting of metal alloys.

In addition to the advantages linked to the stability of these sulfides in air, the latter provide the advantages of the corresponding metal alloys, as a catalyst, namely:
the decrease in the temperature necessary for the growth of the nanowires,
the fact that these alloys are inexpensive and non-toxic.

According to an embodiment, the catalyst comprising a ternary or quaternary metal sulfide, in particular $CuInS_2$ or $Cu_2ZnSnS_4$, is in the form of nanoparticles.

These nanoparticles are advantageously stable in air, not forming any or forming little oxide.

These nanoparticles can further be prepared easily, from simple metal salts[30,31,32,33,34,35]. Controlling the diameter thereof is easy.

The nanoparticle form has the following advantages:
the decrease in melting temperature of the metal in the form of nanoparticles, and consequently the decrease in the temperature necessary for the growth of the nanowires,
in the case of nanoparticles that are homogenous in diameter, the possibility of obtaining nanowires that are homogenous in diameter,
in the case of nanoparticles that are homogenous in diameter, the possibility of obtaining doped nanowires that are homogenous in doping rate.

The steps of placing in contact and heating are particularly implemented in any nanowire synthesis method known to a person skilled in the art, in particular Vapour-Liquid-Solid (VLS), supercritical fluid-liquid-solid (SFLS) growth or pyrolytic methods.

In VLS-type methods, the catalyst, comprising a metal sulfide and/or the metal itself, is in the form of small droplets or small crystals. This catalyst, capable of dissolving the Si and/or Ge atoms constituting the nanowire, is placed in the presence of a gaseous silicon source and/or a gaseous germanium source. When the catalyst comes to saturation, the dissolved atoms coalesce on the surface of the catalyst and precipitate or crystallise in the form of a nanowire.

In SFLS-type methods, the silicon and/or germanium nanowires are obtained in supercritical fluids at a high temperature by thermally degrading organosilanes and/or organogermanes in the presence of catalyst nanoparticles.

In pyrolytic methods, the silicon source and/or the germanium source, in particular organosilanes and/or organogermanes, undergo a pyrolysis, in other words a thermal decomposition generating pyrolysis vapours which, on contact with a supported catalyst, in particular on a sacrificial substrate, will lead to the growth of silicon nanowires on said support.

The heating, in particular, is carried out at a temperature greater than or equal to the melting temperature $T_{fe}$ of the metal-silicon or metal-germanium eutectic, and/or at a pressure of between 0.1 millibar and 200 bar, in particular the atmospheric pressure, for example 1 bar, to 100 bar, for example under atmospheric pressure. The melting temperature $T_{fe}$ of the tin-silicon eutectic is, for example, around 230° C. at atmospheric pressure.

According to an embodiment, the heating is carried out at a temperature of between $T_{fe}$ and $T_{fe}+200°$ C., in particular between $T_{fe}$ and $T_{fe}+100°$ C., for example under atmospheric pressure.

According to another embodiment, the heating is carried out at a temperature of between 200° C. and 1000° C., in particular between 230° C. and 500° C., more specifically between 250° C. and 500° C., more specifically still between 300° C. and 450° C., in particular between 300° C. and 400° C., and/or at a pressure of between 0.1 millibar and 200 bar, in particular atmospheric pressure, for example 1 bar, to 100 bar, for example under atmospheric pressure.

According to another embodiment, said metal(s) are selected from among Sn, In, Bi, Sb, and Ga, and the heating is carried out at a temperature of between 200° C. and 500° C., in particular between 230° C. and 500° C., more specifically between 250° C. and 500° C., more specifically still between 300° C. and 450° C., in particular between 300° C. and 400° C., and/or at a pressure of between 0.1 millibar and 200 bar, in particular atmospheric pressure, for example 1 bar, to 100 bar, for example under atmospheric pressure.

According to another embodiment, the catalyst comprises a ternary or quaternary metal sulfide, in particular $CuInS_2$ or $Cu_2ZnSnS_4$, and the heating is carried out at a temperature of between 200° C. and 500° C., in particular between 230° C. and 500° C., more specifically between 300° C. and 500° C., more specifically still between 350° C. and 500° C., and/or at a pressure of between 0.1 millibar and 200 bar, in particular atmospheric pressure, for example 1 bar, to 100 bar, for example under atmospheric pressure.

According to another embodiment, said metal(s) are selected from among Ti and Cu, and the heating is carried out at a temperature of between 300° C. and 1000° C., in particular between 400° C. and 600° C., and/or at a pressure of between 0.1 millibar and 200 bar, in particular atmospheric pressure, for example 1 bar, to 100 bar, for example under atmospheric pressure.

According to another embodiment, the metal is Zn, and the heating is carried out at a temperature of between 300° C. and 600° C., in particular between 400° C. and 600° C., and/or at a pressure of between 0.1 millibar and 200 bar, in particular atmospheric pressure, for example 1 bar, to 100 bar, for example under atmospheric pressure.

According to another embodiment, the metal is Sn, and the heating is carried out at a temperature of between 200° C. and 500° C., in particular between 230° C. and 500° C., more especially between 250° C. and 500° C., more specifically between 300° C. and 450° C., in particular between 300° C. and 400° C., and/or at a pressure of between 0.1 millibar and 200 bar, in particular atmospheric pressure, for example 1 bar, to 100 bar, for example under atmospheric pressure.

According to another embodiment, the pressure is between 0.1 millibar and 1 bar, the pressure being in particular atmospheric pressure, said method being in particular of the vapour-liquid-solid (VLS) type.

According to another embodiment, the pressure is between 60 and 200 bar, and the temperature is between 320° C. and 700° C., the step of placing in contact (i) being carried out in the presence of a solvent, for example, toluene, said method being in particular of the supercritical fluid-liquid-solid (SFLS) type.

According to an embodiment, the silicon source is selected from among silanes, in particular, $SiH_4$; $SiCl_4$; and organosilanes.

The silicon source is, in particular, a silane of formula $Si_nH_{(2n+1)}$ with n ranging from 1 to 10, or an organosilane, in particular an organomonosilane, an organodisilane or an organotrisilane. The organosilane can be, in particular, a mono-, di- or triarylsilane such as monophenylsilane, diphenylsilane or triphenylsilane, or a mono-, di- or tri-alkylsilane such as octylsilane.

According to an embodiment, the germanium source is selected from among germanes, in particular GeH$_4$; GeCl$_4$; and organogermanes.

The germanium source is, in particular, a germane of formula Ge$_n$H$_{(2n+1)}$ with n ranging from 1 to 10, or an organogermane, in particular an organomonogermane, an organodigermane or an organotrigermane. The organogermane can be, in particular, a mono-, di- or triarylgermane such as monophenylgermane, diphenylgermane or triphenylgermane, or a mono-, di- or tri-alkylgermane such as octylgermane.

The placing in contact in step i) is in particular carried out under an inert atmosphere, in other words in the absence of oxygen and under anhydrous conditions, in particular under vacuum, or under a flow of inert gas such as argon or nitrogen.

According to an embodiment, the catalyst is present on a substrate.

The substrate is a growth substrate. It can be any solid, porous or powdered solid. The substrate is, in particular, a wafer.

In particular, the substrate is a sacrificial substrate.

The sacrificial substrate is a provisional support, which could be necessary for the synthesis of silicon nanowires, but is intended to or able to be removed after the formation of silicon nanowires on the surface thereof.

This sacrificial substrate advantageously limits the diffusion of nanoparticles catalysing the growth of the nanowires. The result is that the catalyst nanoparticles remain of a small size, such that the silicon nanowires obtained have a small diameter that is homogenous.

Furthermore, as another advantage, this sacrificial substrate is removed in water, without any dangerous reagent and without any risk of degrading the surface of the nanowires. Thus the nanowires are recovered pure in the form of a black powder by simply washing with water.

The sacrificial substrate, in particular made of an alkaline, alkaline earth or transition metal halide, carbonate, sulphate or nitrate, can be in particular selected from KCl, MgCl$_2$, CaCl$_2$, Na$_2$CO$_3$, MgCO$_3$, K$_2$CO$_3$, Na$_2$SO$_4$, CaSO$_4$, MgSO$_4$, K$_2$SO$_4$, Ca(NO$_3$)$_2$. It is preferably made of sodium chloride or calcium chloride, in particular sodium chloride. According to a preferred variant, the sacrificial substrate is in powdered form.

The sacrificial substrate made of an alkaline, alkaline earth or transitional metal halide, carbonate, sulphate or nitrate is typically prepared by grinding said anhydrous halide, by means for example of a zirconium ball-grinding roll. The powder of said alkaline, alkaline earth or transition metal halide, carbonate, sulphate or nitrate consisting of particles the diameter of which is between 10 nm and 50 µm, in particular between 50 nm and 50 µm, in particular between 1 µm and 50 µm, in particular around 10 µm. This size advantageously makes it possible to limit the melting of the catalyst particles and therefore to limit the formation of nanowires having a large diameter. The alkaline, alkaline earth or transition metal halide, carbonate, sulphate or nitrate powder is preferably kept under anhydrous conditions.

According to an embodiment, the catalyst is present on a substrate, said catalyst being in the form of one or more thin layers on said substrate. Preferably, the catalyst is made of tin sulfide in the form of one or more thin layers, on said substrate.

It is well known that metal sulfide, in particular tin sulfide, can be deposited in one or more thin layers by different precipitation or layer-by-layer deposition methods, well known to a person skilled in the art. These methods are suited to preparing catalysts for the growth of nanowires.

According to an embodiment, the catalyst is present on a substrate, said catalyst being in the form of nanoparticles on said substrate.

According to an embodiment, the invention relates to a method as defined above, wherein:
the catalyst is present on a substrate, said catalyst being in the form of nanoparticles on said substrate;
the silicon source is an organosilane, and/or the germanium source is an organogermane;
said method being, in particular, a pyrolytic method.

In this embodiment, the substrate is, in particular, a sacrificial substrate.

According to an embodiment, the invention relates to a method as defined above, wherein:
the catalyst is present on a substrate, said catalyst in the form of one or more thin layers on said substrate;
the silicon source is selected from among SiH$_4$ and SiCl$_4$, and/or the germanium source is selected from among GeH$_4$ and GeCl$_4$;
said method being, in particular, of the vapour-liquid-solid (VLS) type.

According to an embodiment, the invention relates to a method as defined above, wherein:
the catalyst is in the form of nanoparticles;
the silicon source is an organosilane, and/or the germanium source is an organogermane;
the step of placing in contact (i) being carried out in particular in the presence of a solvent, for example toluene, said method being, in particular, of the supercritical fluid-liquid-solid (SFLS) type.

In this embodiment, the catalyst is not on a substrate, in other words it is not supported.

According to an embodiment, said step of placing in contact (i) is carried out in the presence of a doping agent.

According to an embodiment, the doping agent is selected from among phosphine, organophosphines, organoarsines, organoboranes, ammonia and aromatic amines.

According to a specific embodiment, the doping agent is selected from among organophosphines, organoarsines, organoboranes and aromatic amines.

According to another specific embodiment, the doping agent is selected from among phosphine and ammonia.

According to an embodiment, the invention relates to a method as defined above, in addition comprising a step (ii) of recovering the silicon and/or germanium nanowires obtained in step (i) and deposition on a conductive or semi-conductive support.

As an example, a silicon and/or germanium nanowire powder according to the present invention (1 mg) is suspended in 50 µL of water or chloroform by stirring in an ultrasound bath. The suspension is deposited in drops on a silicon substrate until the solvent has completely evaporated. After drying, the silicon and/or germanium nanowires form a homogenous porous layer, 25 µm thick on the substrate.

The synthesis of the silicon and/or germanium nanowires according to the method of the invention can be done in batches as in the example below, or in a continuous or semi-continuous flow.

For synthesis in semi-continuous mode, the catalyst, optionally on a substrate, can be placed in a growth chamber, and exposed by opening a valve to another chamber containing the silicon source and/or the germanium source.

For a continuous synthesis, the catalyst, optionally on a substrate, can pass at a controlled speed in the growth chamber, and be exposed to the silicon source and/or the germanium source. Methods on a fluidised bed or on a conveyor are suited to the synthesis of nanowires according to the invention.

Material Made of Silicon and/or Germanium Nanowires

Another subject-matter of the invention relates to a material made of silicon and/or germanium nanowires, obtainable according to the method as defined above.

"Material made of silicon and/or germanium nanowires" means a material comprising or consisting of silicon and/or germanium nanowires.

This material can be characterised in that the silicon nanowires have a diameter of less than 100, 80, 60, 50, 40, 30 or 20 nm, and a length greater than 200 nm.

The size of the nanowires, in particular the diameter thereof and/or the length thereof, can be measured according to conventional techniques, such as scanning electron microscopy and transmission electron microscopy.

The silicon and/or germanium nanowires have, in particular, a diameter of between 5 nm and 100 nm, in particular of 12 nm±5 nm, or 20 nm±5 nm. Typically, this diameter is homogenous over all the silicon and/or germanium nanowires, in other words, less than 30% standard deviation is observed in the distribution of diameters.

The silicon and/or germanium nanowires have, in particular, a length of between 500 nm and 5 µm.

According to an embodiment, the silicon and/or the germanium of the silicon and/or germanium nanowires is partially amorphous.

According to an advantageous embodiment, the silicon and/or germanium nanowires have an amorphous fraction of at least 30%, in particular at least 40, 50 or 60%.

It is particularly known that a certain proportion, in particular a high proportion, of amorphous silicon is an advantage for the application in the anode of lithium-ion batteries (Julien Sourice, "Synthèse de nanocomposites cœur-coquille silicium carbone par pyrolyse laser double étage: application à l'anode de batterie lithium-ion" ("Synthesis of carbon silicon core-shell nanocomposites by two-stage laser pyrolysis: application to the anode of lithium-ion batteries), doctoral thesis in chemistry, University Paris Sud—Paris XI, 2015; and in particular on page 181 where the capacities of batteries made of crystalline silicon and amorphous silicon nanoparticles are compared).

Use of Silicon and/or Germanium Nanowires

Another subject-matter of the present application relates to the use of a material made of silicon and/or germanium nanowires as defined above for preparing electrodes for energy storage devices, in particular batteries, in particular lithium batteries, supercondensers; thermoelectric devices; electronic detectors of chemical or biological substances.

According to an embodiment, the invention relates to the use of a material made of silicon nanowires as defined above for preparing electrodes for energy storage devices, in particular batteries, in particular lithium batteries, supercondensers; thermoelectric devices; electronic detectors of chemical or biological substances.

According to another embodiment, the invention relates to the use of a material made of germanium nanowires as defined above for preparing electrodes for energy storage devices, in particular batteries, in particular lithium batteries, supercondensers; thermoelectric devices; electronic detectors of chemical or biological substances; in particular, energy storage devices, in particular batteries, in particular lithium batteries, supercondensers; thermoelectric devices.

In the case of lithium batteries, the combination of the characteristics of long length, large specific surface area and small homogenous diameters is particularly appealing. This is because, during the charging of the battery, the silicon or germanium connected to the electrode can absorb very large quantities of lithium, until forming the $Li_{15}Si_4$ phase in the case of silicon. A silicon particle thus has the volume thereof increase by a factor of 4, which causes high voltages on the surface of the particle. Beyond a critical size of around 200 nm, the particle is fractured under the effect of the mechanical stress. During the discharging of the battery, the delithiation causes a reduction in volume, but the fractured particles remain separated. The fractured pieces which are no longer electrically connected to the electrode no longer participate in the charging/discharging cycles and the capacity of the battery decreases. The silicon and/or germanium nanowires according to the invention have a long length and a large aspect ratio, which means that they advantageously form a conductive percolating lattice once deposited on a surface. In this lattice, all the silicon and/or germanium nanowires according to the invention are electrically connected through contact with the other nanowires, and can therefore participate in the charging/discharging. In addition, the silicon and/or germanium nanowires according to the invention have a sufficiently thin diameter to avoid fracture, and therefore the capacity of the battery will be kept during the cycles. Of course, the qualities of low cost and simple implementation in the form of liquid suspension are also significant assets for the industrial production of batteries.

The materials made of silicon and/or germanium nanowires according to the invention are in particular useful for preparing anodes for lithium-metal, lithium-ion, lithium-air, lithium-sulphur batteries, or other lithium or sodium battery technologies.

In the case of supercondensers, the electrodes made of silicon and/or germanium nanowires resist high voltages, and show a great stability to cycling. The current density increases when the diameter of the nanowires decreases. The silicon and/or germanium nanowires according to the invention advantageously make it possible to obtain higher current densities thanks to the very thin diameter thereof.

The materials made of silicon and/or germanium nanowires according to the invention are thus particularly useful for preparing anodes and/or cathodes of supercondensers, micro-supercondensers or ultra-microcondensers.

The material made of silicon and/or germanium nanowires according to the invention can also be used for applications in thermoelectric energy recovery or cooling devices. Indeed, thermoelectric materials must have a high Seebeck coefficient, good electrical conductivity and low thermal conductivity. Silicon and germanium are useful thermoelectric materials when they are highly doped thanks to high electrical conductivity and a high Seebeck coefficient.

The silicon and/or germanium nanowires according to the invention, optionally mixed with other components, and compressed into one thermoelectric solid material are particularly useful for preparing a Peltier cooling unit or thermoelectric generator for recovering thermal energy.

Material made of silicon and/or germanium nanowires is moreover useful for preparing a sensitive conductive support for a resistive, capacitive or field effect transistor mode chemical detector.

Another subject-matter of the invention relates to the use of a binary metal sulfide or a multinary metal sulfide, said metal(s) being selected from Sn, In, Bi, Sb, Ga, Ti, Cu, and Zn, as a catalyst for preparing a material made of silicon and/or germanium nanowires.

Definitions

"Nanowire" means a wire the diameter of which is less than 100 nm, in particular between 1 and 50 nm or between 60 and 80 nm. The silicon and/or germanium nanowires obtained according to the method of the invention advantageously have a diameter of between 5 and 30 nm, or between 60 and 80 nm.

"Silicon and/or germanium" means silicon, germanium and all Si—Ge alloys.

"Silicon and/or germanium nanowire" means a nanowire consisting of silicon and/or germanium, or comprising more than 90% by mass of silicon and/or germanium, said nanowire being optionally coated by an outer layer not containing silicon and/or germanium, or less than 50% by mass of silicon and/or germanium.

This layer can have a mass of between 1% to 80% of the mass of the nanowire that it coats. It can be formed during the synthesis of the nanowire, containing for example around 30% carbon, or be added after the formation of the nanowire by methods well known to a person skilled in the art.

When the nanowire is coated by an outer layer, the core of the nanowire is the silicon and/or germanium nanowire per se, as defined in the present application.

Silicon and/or germanium nanowires can in particular include traces of the metal that was used as a catalyst, and/or if necessary the doping agent or one or more compounds from the reaction between the doping agent and the nanowires.

"Catalyst" means a compound comprising or consisting of a metal sulfide and making it possible to catalyse the growth of the nanowires, optionally after decomposition of all or part of said metal sulfide into the corresponding metal.

The catalyst is, in particular, in nanometric form, more specifically in the form of metal sulfide nanoparticles or one or more thin layers of metal sulfide.

Except for any specification to the contrary, "metal sulfide" means binary metal sulfide or multinary metal sulfide.

"Sacrificial substrate" means a provisional support, which could be necessary for the synthesis of silicon nanowires, but intended to be or able to be removed after the formation of silicon nanowires on the surface thereof.

"Thin layer" means a catalyst nanofilm on a substrate, said nanofilm having in particular an average thickness of between 1 and 50 nm.

Amorphous means a compound wherein the atoms do not respect any order at medium and long range. In contrast, a crystalline compound is a compound wherein the atoms are organised into an ordered lattice and respect an order at medium and long range.

Thus "amorphous fraction" means the fraction of silicon and/or germanium in amorphous form; an amorphous fraction of 0% corresponds to a crystalline compound, whereas an amorphous fraction of 100% corresponds to an amorphous compound.

The amorphous fraction can be quantified by different techniques, well-known to a person skilled in the art, for example defined in Threlfall, T. L. Analyst 1995, 120, p. 2435-2459 or in Caira, M. R. Topics in Current Chemistry 1998, 198, p 163-208, such as X-rays diffraction or differential scanning calorimetry in isothermal mode.

FIGURES

The curve (1) shows the loss of mass during heating a sample of SnS nanoparticles which could be used in the context of the present invention: the sample contains 60% organic stabilisers in order to keep the nanoparticles in suspension (suspension stable over several years). These organic stabilisers are thermally decomposed at 220 and 350° C., leaving the inorganic core, which does not show any decomposition until 1000° C.

The curve (2) shows the loss of mass during heating of a sample of the same SnS nanoparticles where the majority of organic stabilisers have been removed by washing (20 mg of nanoparticles are washed in 100 ml of methanol with 1.4% acetone added, separated by centrifugation at 20000 g for 10 minutes, and then dried at 50° C. under argon for 10 minutes). The loss of mass due to the decomposition of the organic stabilisers is still visible on the curve (2) for 20% of the total mass, and then the inorganic core does not undergo decomposition before 700° C.

EXAMPLES

Example 1: Synthesis of a Batch of Silicon Nanowires

1/ SnS nanoparticles 5.5 nm in diameter are prepared from two solutions A and B, prepared as follows. Solution A containing 3 ml of trioctylphosphine (6.7 mmol), 380 mg of tin chloride $SnCl_2$ (2 mmol) and 5 ml of octadecene (15.6 mmol) is placed under argon and heated to 60° C., and then 100° C. for 5 minutes. The temperature is increased to 150° C. and 1.5 ml of oleic acid is added. Solution B containing 3 ml of trioctylphosphine (6.7 mmol), 150 mg of thioacetamide (1 mmol) and 5 ml of oleylamine (15.2 mmol) is placed under argon and heated to 60° C., and then to 100° C. for 5 minutes. Solution B is added into solution A quickly with a syringe. The reaction is stopped at the end of 2 minutes by cooling in an ice bath.

2/ After adding 20 ml of methanol, the solution is centrifuged (9000 rpm, 2 minutes). The lower part is re-dispersed in 6 ml of dichloromethane. The solution is centrifuged (3000 rpm, 2 minutes) to remove the lower part. The supernatant is taken up in 24 ml of chloroform and 2 ml of oleylamine. 30 ml of methanol is added to precipitate the nanocrystals by centrifugation (9000 rpm, 2 minutes). The lower part is re-dispersed in 6 ml of chloroform and centrifuged (3000 rpm, 2 minutes), to remove the lower part. The supernatant is a stable solution of SnS nanocrystals, 5.5 nm in diameter.

It must be noted that calibrated nanoparticles of a size selected from within a relevant diameter range for the growth of nanowires (in particular, from 7 to 23 nm) can be obtained using protocol A defined in Reiss et al.[17]

3/ 0.45 mg of SnS nanocrystals in suspension in 450 µl of chloroform is placed in contact with 90 mg of calcium carbonate microparticles in 5 ml of cyclohexane. The cyclohexane is evaporated under argon flow, under heating to 60° C. The calcium carbonate particles covered with SnS nanocrystals are mixed with 285 µL of diphenylsilane (1.5 mmol). It all is placed in a 10 ml glass tube, vacuum-sealed. The tube is heated to 350° C. for one hour, then cooled.

4/ The solid is washed with 15 ml of 2M hydrochloric acid and 10 ml of chloroform. The silicon nanowires are recovered at the interface between chloroform and aqueous phase after (8000 rpm, 10 minutes). A second identical washing is carried out. The nanowires are then washed with 25 ml of ethanol and centrifuged (8000 rpm, 10 minutes). The lower part taken up in the chloroform contains silicon nanowires, 20 nm in diameter, ready to be used.

Example 2: Synthesis of Doped Nanowires

Steps 1/ to 4/ defined above are repeated, with the only modification in step 3/, of diphenylphosphine $P(C_6H_5)_2H$ being introduced in a mixture in the diphenylsilane in a proportion of 0.1 to 3% by mass.

Example 3: Preparation of Electrodes for Lithium Batteries 54 mg of silicon nanowires obtained in example 1 are ground in a mortar with 7 mg of black carbon and 7 mg of carboxy-methylcellulose in water (1 ml).

The paste obtained is deposited by coating on an 0.8 mg/cm$^2$ metal film and dried for 6 hours at 60° C., under vacuum.

The electrode is mounted as a cathode in a lithium battery, with a Villedon separator impregnated with an electrolyte consisting of an LiPF$_6$ solution in a 1/1 by mass mixture of ethylene carbonate and diethyl carbonate, against a metal lithium anode. It all is sealed in a button battery.

The lithium battery is tested in discharging/charging cycles, over 70 cycles, at a speed of C/20 for the first cycle and C/5 for the following cycles. By definition, a charging speed of C/20 (C/5 respectively) indicates that the battery is fully charged in 1/20 hour (1/5 hour respectively).

Example 4: Preparation of Electrodes for a Supercondenser 1 mg of doped silicon nanowires obtained in example 2 are suspended in 200 µL of chloroform. A 1 cm$^2$ piece of ultra-doped silicon wafer is stripped by soaking in an aqueous solution of hydrofluoric acid, 10% by mass. The silicon nanowire suspension of the invention is deposited on this substrate. The deposition is dried in ambient air. Two identical electrodes are prepared for producing a supercondenser. The two electrodes according to the invention are assembled into a sandwich opposite each other, separated by a Whatman filter paper separator impregnated with electrolyte consisting of 1-methyl-1-propylpyrolidinium bis-trifluoromethylsulfonide imide ionic water. The assembly of the supercondenser is done in an inert atmosphere.

The capacitive performance of the supercondenser is tested by cyclic voltametrics.

Example 5: Study of the Stability of Metal Sulfides, According to the Temperature, Under Atmospheric Pressure At ambient pressure, metal sulfides are known to be stable at a temperature up to 700-900° C. generally, and are decomposed beyond that. This is highlighted by the thermogravimetric analysis (TGA) measurement under argon of the SnS nanoparticles used in the context of the present invention and presented in FIG. 2.

Figure 1:
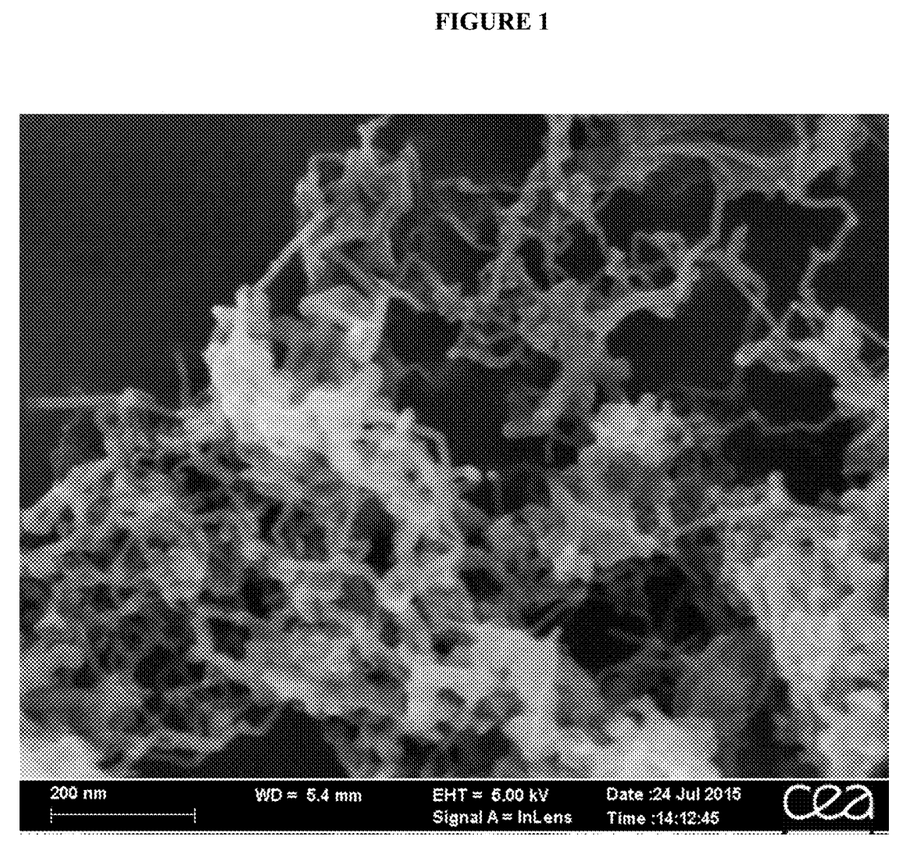
FIG. 1 is an image of the nanowires obtained in example 1, taken by scanning electron microscopy.
Figure 2:
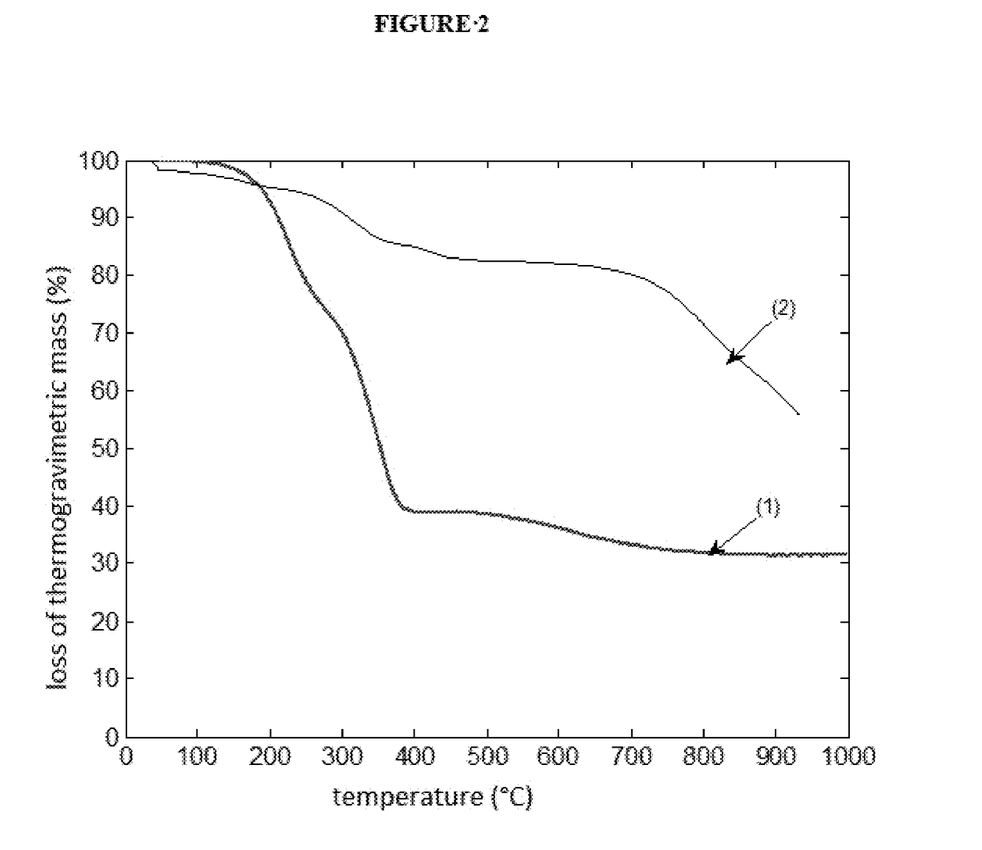
FIG. 2 is a thermogravimetric analysis (TGA) measurement under argon of SnS nanoparticles which could be used in the context of the present invention.

Thus the tin sulfide SnS nanoparticles are not decomposed, under the conditions of obtaining the curves (1) and (2) in FIG. 2, into tin Sn nanoparticles, at a temperature of between 380 and 450° C., as particularly used in the present invention.

Example 6: Analysis of Silicon Nanowire Rays by X-Ray Diffraction

Figure 3:
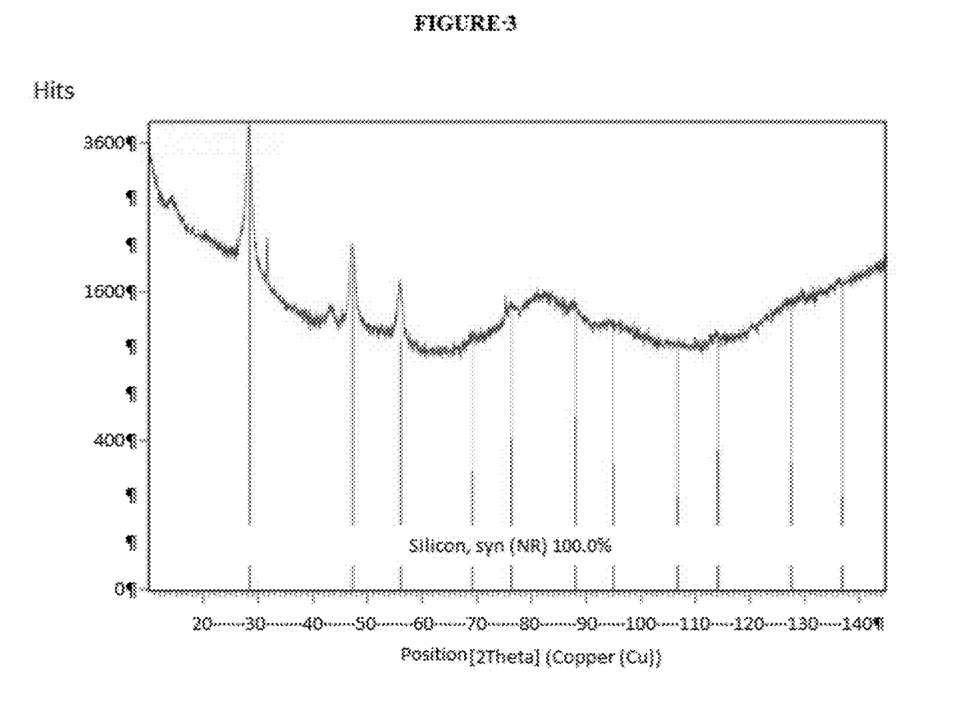
FIG. 3 illustrates the analysis by X-ray diffraction of silicon nanowires obtained in the context of the present invention.

The use of SnS nanoparticles as silicon nanowire growth catalysts makes it possible to obtain nanowires having a high proportion of amorphous silicon, as demonstrated by the analysis by X-ray diffraction presented in FIG. 3. In FIG. 3, the vertical lines indicate the positions of the diffraction peaks that are typical of crystalline silicon. The diffractogram shows the peaks at the expected positions (29°, 47°, 56°, 76°, 88°, 104°), showing the presence of crystalline silicon in the form of crystals of a nanometric size inside the nanowires. In addition to these indexed peaks, the diffractogram shows a large peak centred at 82° and spreading from 65° to 105°. Other less intense wide peaks are visible under the indexed diffraction peaks towards 25° and 51°. These wide peaks are due to an amorphous form of silicon present in the nanowires. This amorphous form represents a large quantity of material with respect to the crystallised part, as demonstrated by the high intensity of the amorphous silicon signal with respect to the crystalline silicon signal on the diffractogram. The high proportion of silicon in amorphous form in the nanowires is not observed for the silicon nanowires obtained on a gold catalyst.

REFERENCES

[1] Aaron M. Chockla, Timothy D. Bogart, Colin M. Hessel, Kyle C. Klavetter, C. Buddie Mullins, and Brian A. Korgel, 'Influences of Gold, Binder and Electrolyte on Silicon Nanowire Performance in Li-Ion Batteries', *The Journal of Physical Chemistry C* 2012, 116, 18079-86.

[2] X. Lu, C. M. Hessel, Y. Yu, T. D. Bogart, and B. A. Korgel, 'Colloidal Luminescent Silicon Nanorods', *Nano Lett* 2013.

[3] Lim, K. W.; Lee, J. I.; Yang, J.; Kim, Y. K.; Jeong, H. Y.; Park, S.; Shin, H. S. *ACS applied materials & interfaces* 2014, 6, 6340.

[4] Aaron M. Chockla, Timothy D. Bogart, Colin M. Hessel, Kyle C. Klavetter, C. Buddie Mullins, and Brian A. Korgel, 'Influences of Gold, Binder and Electrolyte on Silicon Nanowire Performance in Li-Ion Batteries', *The Journal of Physical Chemistry C* 2012, 116, 18079-86.

[5] Fang-Wei Yuan, Hong-Jie Yang, and Hsing-Yu Tuan, 'Seeded Silicon Nanowire Growth Catalyzed by Commercially Available Bulk Metals: Broad Selection of Metal Catalysts, Superior Field Emission Performance, and Versatile Nanowire/Metal Architectures', *Journal of Materials Chemistry* 2011, 21, 13793.

[6] Benjamin T. Richards, Bernard Gaskey, Barnaby D. A. Levin, Kevin Whitham, David Muller, and Tobias Hanrath, 'Direct Growth of Germanium and Silicon Nanowires on Metal Films', *Journal of Materials Chemistry C* 2014, 2, 1869.

[7] K. W. Lim, J. I. Lee, J. Yang, Y. K. Kim, H. Y. Jeong, S. Park, and H. S. Shin, 'Catalyst-Free Synthesis of Si-Siox Core-Shell Nanowire Anodes for High-Rate and High-Capacity Lithium-Ion Batteries', *ACS Appl Mater Interfaces* 2014, 6, 6340-5.

[8] Byung-Sung Kim, Tae-Woong Koo, Jae-Hyun Lee, Duk Soo Kim, Young Chai Jung, Sung Woo Hwang, Byoung Lyong Choi, Eun Kyung Lee, Jong Min Kim, and Dongmok Whang, 'Catalyst-Free Growth of Single-Crystal Silicon and Germanium Nanowires', *Nano Letters* 2009, 9, 864-69.

[9] T. D. Bogart, X. Lu, and B. A. Korgel, 'Precision Synthesis of Silicon Nanowires with Crystalline Core and Amorphous Shell', *Dalton Trans* 2013, 42, 12675-80.

[10] Hugh Geaney, Tadhg Kennedy, Calum Dickinson, Emma Mullane, Ajay Singh, Fathima Laffir, and Kevin M. Ryan, 'High Density Growth of Indium Seeded Silicon Nanowires in the Vapor Phase of a High Boiling Point Solvent', *Chemistry of Materials* 2012, 24, 2204-10.

[11] R. Rakesh Kumar, K. Narasimha Rao, and A. R. Phani, 'Bismuth Catalyzed Growth of Silicon Nanowires by Electron Beam Evaporation', *Materials Letters* 2012, 82, 163-66.

[12] Ji Liu, Shi-Hua Huang, Li-Ping Chen, and Lv He, 'Tin Catalyzed Silicon Nanowires Prepared by Magnetron Sputtering', *Materials Letters* 2015, 151, 122-25.

[13] Xiaotang Lu, Kenneth J. Anderson, Philip Boudjouk, and Brian A. Korgel, 'Low Temperature Colloidal Synthesis of Silicon Nanorods from Isotetrasilane, Neopentasilane, and Cyclohexasilane', *Chemistry of Materials* 2015, 27, 6053-58.

[14] X. Lu, C. M. Hessel, Y. Yu, T. D. Bogart, and B. A. Korgel, 'Colloidal Luminescent Silicon Nanorods', *Nano Lett* 2013.

[15] Heurlin, M.; Magnusson, M. H.; Lindgren, D.; Ek, M.; Wallenberg, L. R.; Deppert, K.; Samuelson, L. *Nature* 2012, 492, 90.

[16] Ziyang Lu, Jixin Zhu, Daohao Sim, Wenhui Shi, Yee Yan Tay, Jan Ma, Huey Hoon Hng, and Qingyu Yan, 'In Situ Growth of Si Nanowires on Graphene Sheets for Li-Ion Storage', *Electrochimica Acta* 2012, 74, 176-81.

[17] Protesescu, L.; Rossini, A. J.; Kriegner, D.; Valla, M.; de Kergommeaux, A.; Walter, M.; Kravchyk, K. V.; Nachtegaal, M.; Stangl, J.; Malaman, B.; Reiss, P.; Lesage, A.; Emsley, L.; Copéret, C.; Kovalenko, M. V. Unraveling the Core-Shell Structure of Ligand-Capped Sn/SnOx Nanoparticles by Surface-Enhanced Nuclear Magnetic Resonance, Mössbauer, and X-ray Absorption Spectroscopies. *ACS Nano* 2014, 8, 2639-2648.

[18] Shen, S.; Zhang, Y.; Peng, L.; Xu, B.; Du, Y.; Deng, M.; Xu, H.; Wang, Q. Generalized synthesis of metal sulfide nanocrystals from single-source precursors: size, shape and chemical composition control and their properties. *CrystEngComm* 2011, 13, 4572-4579.

[19] de Kergommeaux, A.; Lopez-Haro, M.; Pouget, S.; Zuo, J.-M.; Lebrun, C.; Chandezon, F.; Aldakov, D.; Reiss, P. Synthesis, internal structure and formation mechanism of monodisperse tin sulfide nanoplatelets. *J. Am. Chem. Soc.* 2015, 137, 9943-9952.

[20] A. de Kergommeaux, J. Faure-Vincent, A. Pron, R. de Bettignies, B. Malaman, and P. Reiss, 'Surface Oxidation of Tin Chalcogenide Nanocrystals Revealed by 119sn-Mossbauer Spectroscopy', *J Am Chem Soc* 2012, 134, 11659-66.

[21] Xue, B.; Xu, F.; Wang, B.; Dong, A. Shape-controlled synthesis of [small beta]-In2S3 nanocrystals and their lithium storage properties. *CrystEngComm* 2016, 18, 250-256.

[22] Han, W.; Yi, L. X.; Zhao, N.; Tang, A. W.; Gao, M. Y.; Tang, Z. Y. Synthesis and shape-tailoring of copper sulfide/indium sulfide-based nanocrystals. *J Am. Chem. Soc.* 2008, 130, 13152-13161.

[23] Shen, S.; Zhang, Y.; Peng, L.; Xu, B.; Du, Y.; Deng, M.; Xu, H.; Wang, Q. Generalized synthesis of metal sulfide nanocrystals from single-source precursors: size, shape and chemical composition control and their properties. *CrystEngComm* 2011, 13, 4572-4579.

[24] Han, J. H.; Lee, S.; Yoo, D.; Lee, J.-H.; Jeong, S.; Kim, J.-G.; Cheon, J. Unveiling Chemical Reactivity and Structural Transformation of Two-Dimensional Layered Nanocrystals. *J. Am. Chem. Soc.* 2013, 135, 3736-3739.

[25] Choi, S.-H.; An, K.; Kim, E.-G.; Yu, J. H.; Kim, J. H.; Hyeon, T. Simple and Generalized Synthesis of Semiconducting Metal Sulfide Nanocrystals. *Adv. Funct. Mater.* 2009, 19, 1645-1649.

[26] Aiwei, T.; Shengchun, Q.; Kai, L.; Yanbing, H.; Feng, T.; Jie, C.; Yongsheng, W.; Zhanguo, W. One-pot synthesis and self-assembly of colloidal copper(I) sulfide nanocrystals. *Nanotechnology* 2010, 21, 285602.

[27] Joo, J.; Na, H. B.; Yu, T.; Yu, J. H.; Kim, Y. W.; Wu, F.; Zhang, J. Z.; Hyeon, T. Generalized and Facile Synthesis of Semiconducting Metal Sulfide Nanocrystals. *J Am. Chem. Soc.* 2003, 125, 11100-11105.

[28] Shen, S.; Zhang, Y.; Peng, L.; Xu, B.; Du, Y.; Deng, M.; Xu, H.; Wang, Q. Generalized synthesis of metal sulfide nanocrystals from single-source precursors: size, shape and chemical composition control and their properties. *CrystEngComm* 2011, 13, 4572-4579.

[29] Pradhan, N.; Katz, B.; Efrima, S. Synthesis of High-Quality Metal Sulfide Nanoparticles from Alkyl Xanthate Single Precursors in Alkylamine Solvents. *J Phys. Chem. B* 2003, 107, 13843-13854.

[30] Park, Y.; Jin, H.; Park, J.; Kim, S. Simultaneous phase and size control in the synthesis of Cu2SnS3 and Cu2ZnSnS4 nanocrystals. *Crystengcomm* 2014, 16, 8642-8645.

[31] Gao, Y.; Yang, H.; Zhang, Y.; Li, J.; Zhao, H.; Feng, J.; Sun, J.; Zheng, Z. Facile non-injection synthesis of high quality CZTS nanocrystals. *Rsc Adv* 2014, 4, 17667-17670.

[32] Steinhagen, C.; Panthani, M. G.; Akhavan, V.; Goodfellow, B.; Koo, B.; Korgel, B. A. Synthesis of Cu2ZnSnS4 Nanocrystals for Use in Low-Cost Photovoltaics. *J. Am. Chem. Soc.* 2009, 131, 12554-12556.

[33] Ibáñez, M.; Zamani, R.; Li, W.; Shavel, A.; Arbiol, J.; Morante, J. R.; Cabot, A. Extending the Nanocrystal Synthesis Control to Quaternary Compositions. *Crystal Growth & Design* 2012, 12, 1085-1090.

[34] Gabka, G.; Bujak, P.; Gryszel, M.; Ostrowski, A.; Malinowska, K.; Zukowska, G. Z.; Agnese, F.; Pron, A.; Reiss, P. Synthesis and surface chemistry of high quality wurtzite and kesterite Cu2ZnSnS4 nanocrystals using tin(II) 2-ethylhexanoate as a new tin source. *Chem. Commun.* 2015, 51, 12985-12988.

[35] Yan, C.; Gu, E.; Liu, F.; Lai, Y.; Li, J.; Liu, Y. Colloidal synthesis and characterizations of wittichenite copper bismuth sulfide nanocrystals. *Nanoscale* 2013, 5, 1789-1792.

The invention claimed is:

1. Method for preparing a material made of silicon and/or germanium nanowires, that comprises the steps of:
   i) placing a silicon source and/or a germanium source in contact with a catalyst comprising a binary metal sulfide or a multinary metal sulfide, said metal(s) being selected from Sn, In, Bi, Sb, and Ga, by means of which the silicon and/or germanium nanowires are obtained,
   ii) optionally recovering the silicon and/or germanium nanowires obtained in step (i);
   the catalyst, and optionally the silicon source and/or the germanium source, being heated before, during, and/or after the placing in contact under temperature and pressure conditions allowing the growth of silicon and/or germanium nanowires, the heating being done at a temperature of between 200° C. and 500° C.

2. Method according to claim 1, wherein the metal is tin.

3. Method according to claim 1, wherein the silicon source is selected from silanes and organosilanes.

4. Method according to claim 1, wherein the germanium source is selected from germanes and organogermanes.

5. Method according to claim 1, wherein the catalyst is in the form of nanoparticles.

6. Method according to claim 1, wherein said catalyst is present on a substrate.

7. Method according to claim 1, wherein the catalyst is present on a substrate, said catalyst being in the form of one or more thin layers on said substrate.

8. Method according to claim 1, wherein the catalyst is present on a substrate, said catalyst being in the form of nanoparticles on said substrate.

9. Method according to claim 1, wherein the silicon source is selected from $SiH_4$ and $SiCl_4$.

10. Method according to claim 1, wherein the germanium source is selected from $GeH_4$ and $GeCl_4$.

* * * * *